(12) United States Patent
Riley

(10) Patent No.: US 6,915,446 B2
(45) Date of Patent: *Jul. 5, 2005

(54) SUPPORTING ERROR CORRECTION AND IMPROVING ERROR DETECTION DYNAMICALLY ON THE PCI-X BUS

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 566 days.

This patent is subject to a terminal disclaimer.

(21) Appl. No.: 09/967,612

(22) Filed: Sep. 29, 2001

(65) Prior Publication Data

US 2003/0070111 A1 Apr. 10, 2003

(51) Int. Cl.⁷ .............................................. G06F 11/08
(52) U.S. Cl. ..................... 714/5; 714/43; 714/44; 714/48; 714/52; 714/701; 714/758; 710/307
(58) Field of Search .................... 714/5, 43, 44, 714/48, 52, 701, 712, 751, 752, 758, 799; 710/307

(56) References Cited

U.S. PATENT DOCUMENTS

| | | | | |
|---|---|---|---|---|
| 5,978,953 A | * | 11/1999 | Olarig | 714/768 |
| 6,085,272 A | * | 7/2000 | Kuo | 710/305 |
| 2003/0065842 A1 | * | 4/2003 | Riley et al. | 710/105 |
| 2003/0097509 A1 | * | 5/2003 | Fry et al. | 710/305 |
| 2004/0054955 A1 | * | 3/2004 | Riley | 714/781 |

OTHER PUBLICATIONS

PCI Special Interest Group, "PCI–X Addendum to the PCI Local Bus Specification", Sep. 22, 1999, Revision 1.0, pp. 2, and 11.*

* cited by examiner

Primary Examiner—Bryce P. Bonzo
Assistant Examiner—Joseph D Manoskey

(57) ABSTRACT

An error correction code mechanism for the extensions to the peripheral component interconnect bus system (PCI-X) used in computer systems is fully backward compatible with the full PCI protocol. The error correction code check-bits can be inserted to provide error correction capability for the header address and attribute phases, as well as for burst and DWORD transaction data phases. The error correction code check-bits are inserted into unused attribute, clock phase, reserved, or reserved drive high portions of the AD and/or C/BE# lanes of the PCI-X phases.

24 Claims, 3 Drawing Sheets

SUPPORTING ERROR CORRECTION AND IMPROVING ERROR DETECTION DYNAMICALLY ON THE PCI-X BUS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention is related to error detection and correction on computer system buses, and in particular, error correction code (ECC) support on the high-performance extension (PCI-X) to the peripheral component interconnect (PCI) computer system bus.

2. Description of the Related Art

All the major subsystems in a modem computer, including the CPU, the memory, and the storage subsystems have improved their fault tolerance. Today, however, PCI's ability to recover form parity exceptions is virtually non-existent. As PCI is at the core of the system architecture, its inability to recover from exceptions reduces the overall system availability. PCI is the weak link. If a parity error is detected on PCI, the system will crash.

As PCI performance increases, it is subject to the same error conditions. Failure rate increases as frequency increases and error rate increases as voltage swings decrease (e.g., as nominal operating voltage decreases). PCI needs further improvement to close the loop on end-to-end full error correction coverage. PCI-X is supposed to lead to follow-on technologies that include better channel protection. Therefore, for the above and other reasons it is imperative to improve error correction and detection on the PCI bus without adding cost to the system, as a better protection scheme may predicate the longevity of PCI-X.

SUMMARY OF THE INVENTION

Embodiments of the present invention provide an error correction mechanism for the extensions to the peripheral component interconnect bus system (including PCI-X) used in computer systems that are fully backward compatible with conventional PCI (including PCI-X) systems. Error correction code (ECC) syndrome or check-bits are inserted into different unused or reserved fields covering either the transaction header information (the address phase and the attribute phases) or the data information (one or more data phases for block burst or a single data phase for DWORD transaction). For ECC coverage of the transaction header information, the unused attribute (usually RDH-reserved drive high) and/or the undefined AD bus (the clock after the attribute phase) can be used to carry the ECC check-bits. For coverage of the data phase of either 64-bit or 32-bit block transactions, the C/BE# lanes, which are currently reserved, can be used to carry the ECC check-bits, with the additional restriction for 32-bit transfers, which must be aligned to a logical 64-bit to carry the needed 8-bit of ECC check-bits. For DWORD transactions the 8-bit ECC check-bits can be allocated either in the reserved first 8-bits of the attribute or transferred in two parts on the C/BE# lanes the first two clocks after the attribute phase.

Embodiments of the present invention feature a technique, in a computer system, of providing error correction for PCI-X. According to the technique, a plurality of PCI-X phases is created in the computer system. A fully backward compatible error correction mechanism for PCI-X is provided in the computer system by inserting an error correction code into unused portions of the plurality of PCI-X phases.

DETAILED DESCRIPTION OF INVENTION

PCI-X is described in the PCI-X Addendum to the PCI Local Bus Specification, Revision 1.0 (the PCI-X specification) and in U.S. Pat. No. 6,266,731 B1 to Riley et al., entitled High Speed Peripheral Interconnect Apparatus, Method and System, which are incorporated by reference herein in their entireties. PCI is described in the PCI Local Bus Specification, Revision 2.2 (the general PCI specification), which also is incorporated by reference herein in its entirety. When PCI is mentioned herein, it is meant to include all of PCI, including PCI-X, and when PCI bus, the bus operating in PCI mode, or PCI device are mentioned herein, they are meant to include PCI-X. Full PCI protocol refers to the PCI protocol that includes PCI-X.

The old error correction solutions do not provide for any fault tolerance mechanism for PCI. Error correction code (ECC) in PCI-X updates PCI to the level of current memory, CPU, network and storage subsystems. The present invention provides a technique to make PCI-X a more fault tolerant interconnect by adding ECC support without the need for any additional pins.

With the introduction of the PCI-X extension to PCI and its use of block transfers which moves data in a contiguous sequential fashion, the C/BE lanes are now reserved and therefore available for other functions. The present invention uses the C/BE to carry ECC data for each 64-bit quanta of data transfers, thereby allowing the creation of a more fault tolerant PCI without the need for any addition sideband signals. In addition, the address and attribute phases of a PCI-X transaction can also be covered with ECC data by using reserved attribute bits. Thirty-two-bit support for ECC also can be provided with some restrictions.

The present invention provides a technique for enhancing the operation of computer system buses that use the extensions to the peripheral component interconnect specification (hereinafter PCI-X buses), as well as logic circuits and signal protocols thereof. The ECC technique of the present invention is similar to any of the ECC techniques used today by the memory subsystems, RAID storage, Fiber Channel, SCSI, or processor interconnects, and the ECC technique conforms with the PCI standard. For illustrative purposes, embodiments of the present invention are described herein for computer systems using Intel Corporation microprocessor architectures and certain terms and references are specific to such processor platforms. PCI-X and the enhancements described herein according to the present invention, however, are hardware independent, and may be used with any host computer designed for this interconnect standard. As will be appreciated by those skilled in the art of computer systems, the present invention may be adapted and applied to any computer platform utilizing the PCI-X standard.

Figure 1:
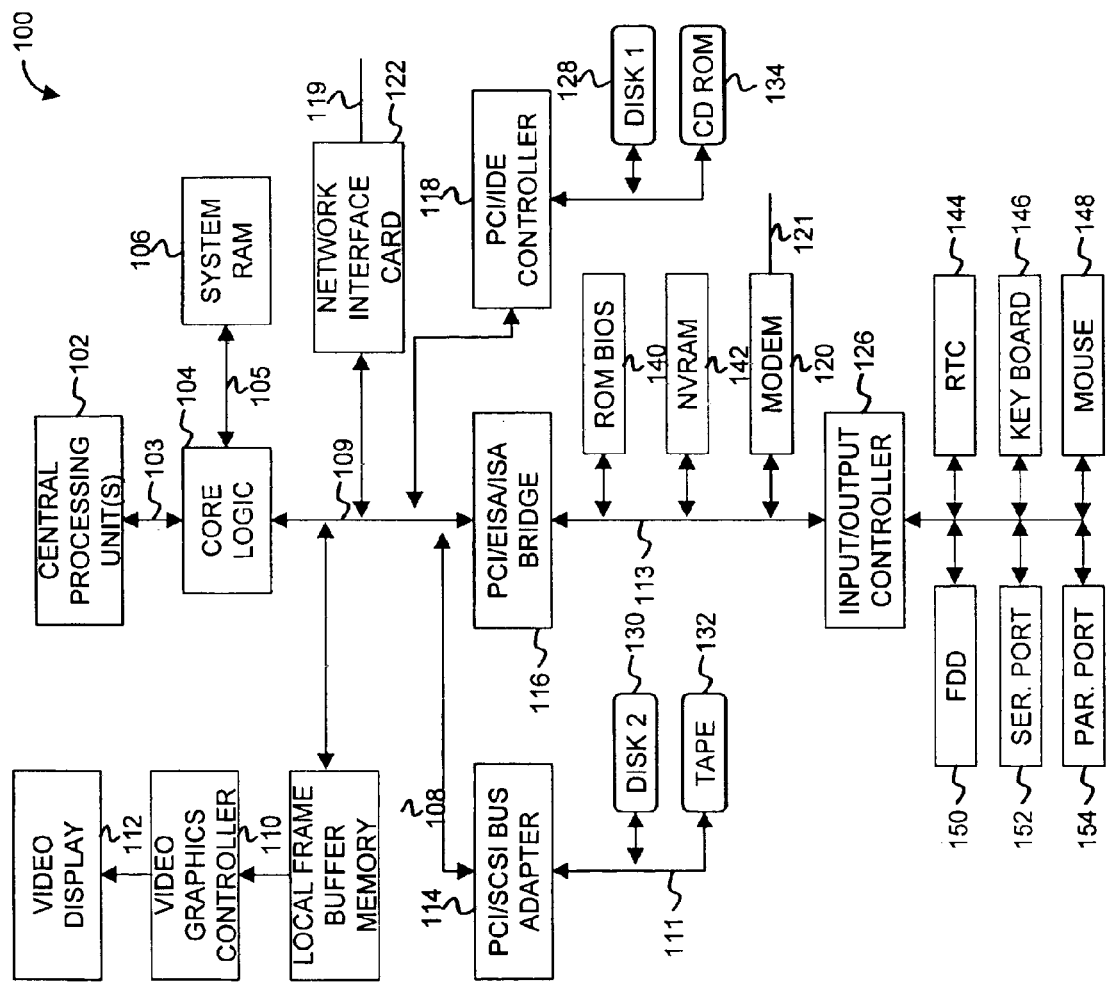
FIG. 1 is an exemplary schematic block diagram of a computer system in accordance with an embodiment of the invention.

Referring to FIG. 1, an exemplary schematic block diagram of a computer system according to the present invention is illustrated. The computer system is generally indicated by the numeral 100 and includes central processing unit(s) (CPU) 102, core logic 104 ("North Bridge"), system random access memory (RAM) 106, a video graphics controller 110, a local frame buffer 108, a video display 112, a PCI/SCSI bus adapter 114, a PCI/EISA/ISA bridge 116 ("South Bridge"), a PCI/IDE controller 118, and, optionally, a network interface card (NIC) 122. Single or multilevel cache memory (not illustrated) may also be included in the computer system 100 according to the current art of microprocessor computer systems. The CPU 102 may be a plurality of CPUs 102 in a symmetric or asymmetric multiprocessor configuration.

The CPU 102 is connected to the core logic 104 through a CPU host bus 103. The system RAM 106 is connected to the core logic 104 through a memory bus 105. The core logic 104 includes a host-to-PCI bridge between the host bus 103, the memory bus 105 and a PCI bus 109. More than one PCI bus is contemplated herein as well as PCI-to-PCI bridges (not illustrated), and is within the scope and intent of the present invention. The local frame buffer 108 is connected between the video graphics controller 110 and the PCI bus 109. The PCI/SCSI bus adapter 114, PCI/EISA/ISA bridge 116, PCI/IDE controller 118 and the NIC 122 are connected to the PCI bus 109. Some of the PCI devices, such as the Video controller 110 and NIC 122, may plug into PCI connectors on the computer system 100 motherboard (FIG. 2).

Hard disk 130 and tape drive 132 are connected to the PCI/SCIS bus adapter 114 through a SCSI bus 111. The NIC 122 may be connected to a local area network 119. The PCI/EISA/ISA bridge 116 connects over an ESIA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive (FDD) 150, serial port 152, and parallel port 154. The EISA/ISA bus 113 is a slower information bus than the PCI bus 109, but the cost is less to interface with it. Further, the disk 128 and CD ROM 134 are connected to the PCI/IDE controller 118, as illustrated in FIG. 1.

When the computer system 100 is first turned on, start-up information stored in the ROM BIOS 140 is used to begin operation thereof. Basic setup (BIOS) instructions are stored in the ROM BIOS 140 so that the computer system 100 can load more complex operating system (OS) software from a memory storage device, such as the disk 130. Before the operating system software can be loaded, however, certain hardware in the computer system 100 is configured to properly transfer information from the disk 130 to the CPU 102. In the computer system 100 illustrated in FIG. 1, the PCI/SCSI bus adapter 114 is configured to respond to commands from the CPU 102 over the PCI bus 109 and transfer information from the disk 130 to the CPU 102 via buses 109 and 103. The PCI/SCSI bus adapter 114 is a PCI device and remains platform independent. Therefore, separate hardware independent commands are used to setup and control any PCI device in the computer system 100. These hardware independent commands, however, are located in PCI BIOS contained in the computer system ROM BIOS 140. The PCI BIOS is firmware that is hardware specific but meets the general the PCI specification. Plug and play and PCI devices in the computer system are detected and configured when a system configuration program is executed. The results of the plug and play and PCI device configurations are stored in the NVRAM 142 for later use by the startup programs in the ROM BIOS 140 and the PCI BIOS that configure the necessary computer system 100 devices during startup. Also during startup a built-in-self-test (BIST) may perform diagnostic testing of components, such as PCI devices, in the computer system.

Figure 2:
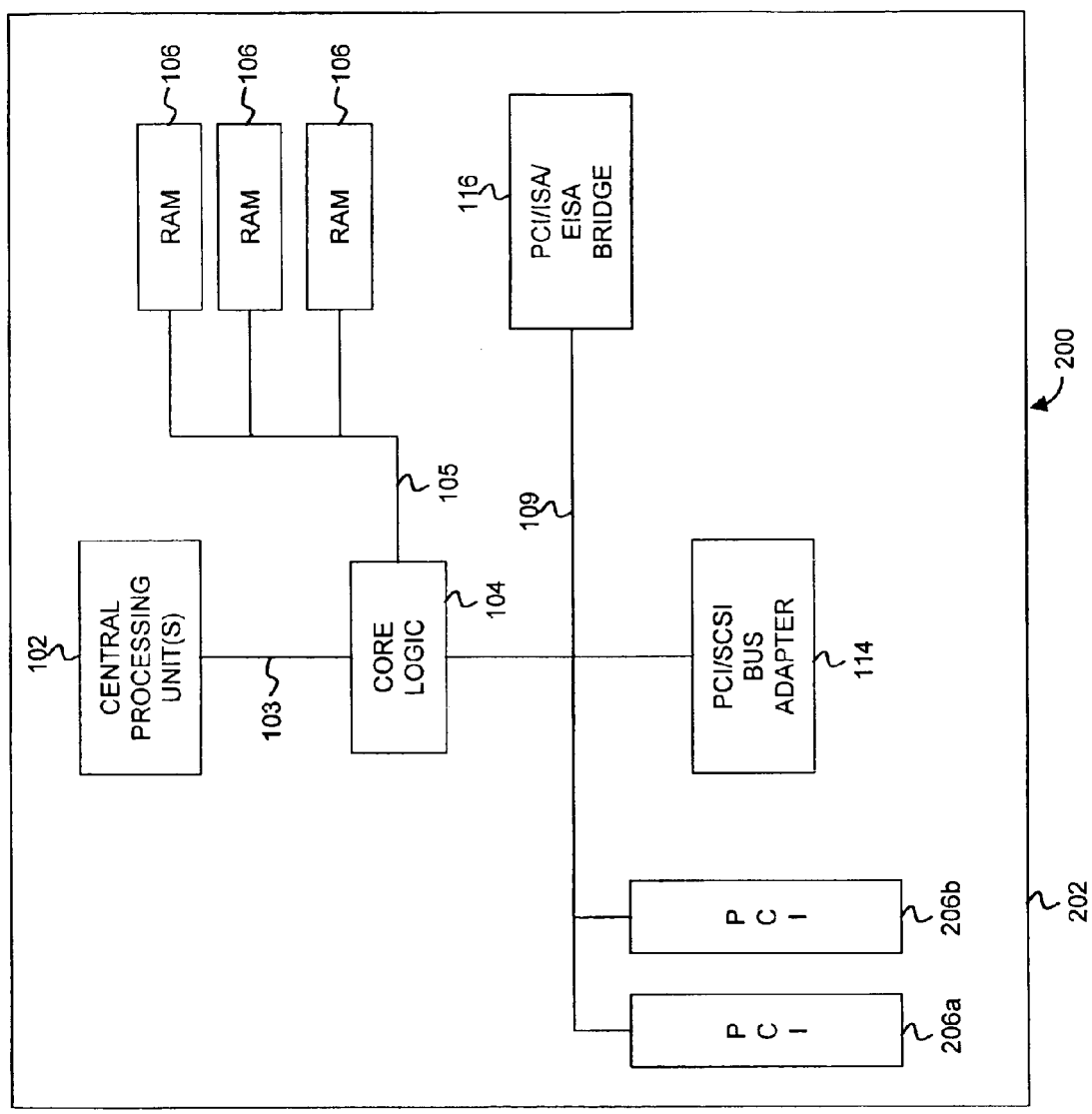
FIG. 2 is an exemplary schematic diagram of a printed circuit motherboard of the computer system of FIG. 1.

Referring to FIG. 2, a schematic diagram of an exemplary computer system motherboard according to FIG. 1 is illustrated. The computer system motherboard 200 includes printed circuit board 202, on which components and connectors are mounted. The printed circuit board 202 includes conductive printed wiring used to interconnect these components and connectors. The conductive printed wiring (illustrated as buses 103, 105 and 109) may be arranged into signal buses having controlled impedance and signaling characteristics. Illustrated on the printed circuit board 202 are the core logic 104, CPU(s) 102, RAM 106, embedded PCI/ISA/EISA bridge 116, embedded PCI/SCSI bus adapter 114, and PCI connectors 206a, 206b (connectors are the same for PCI and PCI-X). The motherboard 200 may be assembled into a case with a power supply, disk drives, etc. (not illustrated), which form the computer system 100 of FIG. 1.

The present invention provides support for one or more error correction codes (ECCs) on the PCI bus, which can be implemented in the computer system of FIGS. 1 and 2, as well as in a variety of other computer systems. ECC support can be made optional in such systems. The ECC check-bits form 8-bit quanta to provide full error correction support for ECC algorithms. Exemplary ECC algorithms are disclosed, for example, in U.S. Pat. No. 5,841,795 to Olarig et al., which is incorporated by reference herein in its entirety. Other ECC algorithms are contemplated, as will be appreciated by those skilled in the art, and the present invention is not limited to any particular or particular type of ECC algorithm.

According to the present invention, the fault tolerance of the PCI bus protocol is improved without adding any pins, and PCI devices having ECC compatibility can correct any single bit on the bus without generating an interrupt that can crash the system.

Figure 3:
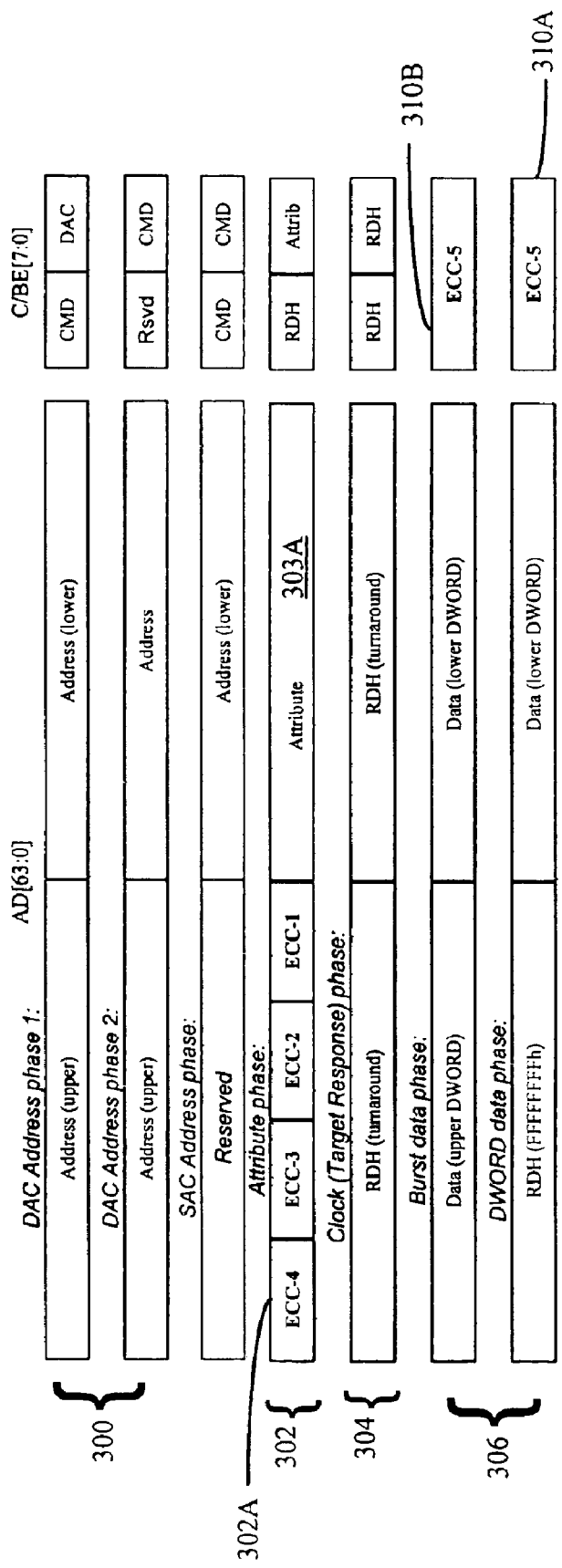
FIG. 3 illustrates all (32-bit and 64-bit) transaction phases for PCI-X showing the reserved bits and an exemplary ECC check-bit allocation, in accordance with embodiments of the invention.

FIG. 3 illustrates all (32-bit and 64-bit) transaction phases for PCI-X showing the reserved (including reserved drive high (RDH)) bits and an exemplary ECC check-bit allocation, in accordance with embodiments of the invention. Such transaction phases could be associated with transactions on the PCI-X bus 109 of FIGS. 1 and 2, according to the PCI-X protocol. A PCI-X bus transaction or transfer consists of one or more address phases, an attribute phase, and any number of data phases, as will be appreciated by those skilled in the art. FIG. 3 shows the PCI-X transaction phases as a combination of address 300 (DAC Address phase 1, DAC Address phase 2, and SAC Address phase), attribute 302, clock (after the attribute phase, also referred to as the target response phase) 304, and data 306 phases signaled by a single assertion or activation of FRAME# on the PCI-X bus. In FIG. 3, "DAC" indicates Dual Address Cycle command as opposed to a Single Address Cycle command (SAC), and "CMD" indicates command other than DAC, as will be appreciated by those skilled in the art.

In FIG. 3, 8-bit ECC check-bits are inserted in the upper half 302A of the attribute phase 302 in the AD[63:32] lanes where unused RDH bits would otherwise be located in the full PCI protocol. These ECC check-bits are used for error correction of the header address and attribute information. Each of the 8-bit ECC check-bits (indicated as ECC-1 to ECC-4) covers 64-bit quanta of the header. Data phase 306 in a transaction will be either a single DWORD data phase or one or more burst data phases, although both types are shown in FIG. 3, as will be appreciated by those skilled in the art. During the data phases 306, for DWORD transactions, the C/BE[7:0]# lanes are used for 8-bit ECC check-bits (shown as ECC-5 310A in FIG. 3) covering error correction of the DWORD data. DWORD transactions address no more than a single DWORD and are permitted to be initiated only as lower bus half 32-bit transactions. In a conventional transaction during the DWORD data phase, the C/BE# bus is RDH and the AD[63:32] bus is unused. Conventionally, both buses are driven high by the initiator. On the other hand, during a burst data phase type of data phase 306 (i.e., Memory Write Block, Memory Read Block, and Split Completion transfers), only the C/BE[7:0]# lanes can be used for 8-bit ECC check-bits. These are shown as ECC-5 310B in FIG. 3. For the DWORD type transaction, alternatively, the ECC-5 check-bits could be located in the lower bus half 303A of the attribute phase 302, or could be multiplexed with other signal bits already being used in the upper and/or lower portions of the attribute phase 302 or other phases where contiguous 8 bits can be found.

Although FIG. 3 only shows the header ECC check-bits inserted into unused (RDH) portions 302A of the upper half of the attribute phase 302, it is to be understood that the check-bits could be inserted into any unused fixed attribute bits, the undefined AD bits clock after the attribute phase, or any RDH portions of the AD and/or C/BE# lanes of the PCI-X phases (i.e., use the unused RDH or other bits), or multiplexed, in accordance with embodiments of the invention. However, a usage model that inserts header ECC check-bits on the AD bus the clock after the attribute phase will not be able to support PCI-X decode speed "A" for Memory Read Immediate transactions. The data phase of Memory Write commands which uses the C/BE# lanes to carry byte enables and as a result, are not available for ECC check-bits. The data phase of the Memory Read (Immediate Only) requires a protocol change (C/BE# lane ownership must be turned turnaround) and would therefore make ECC not interoperable with PCI-X 1.0. Note that 32-bit devices do not normally lend themselves to supporting 64-bit ECC code. As a result, any support for 32-bit devices may be restricted to 64-bit data alignment for burst data transfers.

According to the present invention, an ECC algorithm, such as those described above, can be incorporated into all PCI-X compatible devices of FIGS. 1 and 2 to decode the ECC check-bits. The ECC algorithm is, for example, a hardware algorithm capable of single clock error detection, then correction at 133 MHz using mainstream ASIC technology. The algorithm supports, for example, single bit correcting and 4 adjacent bit (nibble) detecting code.

Table I shows exemplary ECC coverage, including the 8-bit check-bits ECC-1 to ECC-5 discussed above, and their description according to the invention. Table I represents a possible recommendation for a distribution of ECC check-bits for 64-bit quanta, although others are possible.

TABLE 1

ECC Coverage and Description

| ECC | # inputs | Description |
| --- | --- | --- |
| ECC-1 | 64 | Covers the full address phase 1 AD[63:0]. Transferred on AD [63:32] during the attribute phase. |
| ECC-2 | 64 | Covers the full address phase 2 AD[63:0]. Valid for DAC only Transferred on AD[63:32] during the attribute phase. |
| ECC-3 | 48 | Covers the command, attributes, and target response phase byte enables. Input to the ECC generator as: DAC: {CMD[7:4], CMD[3:0], CMD[7:4], CMD[3:0], ATTR_BE[7:0], TR_BE[7:0], ATTR[31:0]} SAC: {CMD[7:4], CMD[3:0], ATTR_BE[7:0], TR_BE[7:0], ATTR[31:0]} Transferred on AD[63:32] during the attribute phase. |
| ECC-4 | NA | Used to transfer a special "signature" that the target can examine to determine if ECC is being transmitted. Transferred on AD[63:32] during the attribute phase. For non-ECC device---AD[63:32] must be driven high. |
| ECC-5 | 64 | Covers the data phase AD[63:0]. It is transferred on C/BE[7:0]# during each data phase (in parallel with the data). |

Note that in this exemplary implementation there are no inputs for ECC-4 (the ECC "signature," discussed below), and 16 zero-fills are required for ECC-3 because there are only 48 inputs. Indeed, any inputs missing or transactions that are 64-bit misaligned either at the start of the transaction and/or at the end of the transaction require the ECC algorithm to be zero-filled for proper 64-bit ECC generation and checking. Unused bytes that make up the misaligned zero-filled sequence are not required to appear on the AD bus. Receiving devices must internally generate the zero-filled byte(s) as needed for ECC checking.

The ECC signature is transferred in ECC-4 (see Table I) and is used by a target device to determine if ECC check-bits are being used. If the ECC signature is driven, for example, during the attribute phase 302, and supported by the target, then the target will decode the received ECC check-bits and use them for error correction. The unique ECC signature that is sent over ECC-4 should have at least 3 bits set to 0. A non-ECC device normally sends FFFFh on these lines because unused bits in PCI-X today are normally driven high, and as a result, an ECC signature needs to be something other than all 1's. Having the 0's will avoid checking ECC due to multiple bit failures on a non-ECC compatible device. For example, "EC" hex (1110 1110b) can be used as signature, although other signatures are possible, as will be appreciated by those skilled in the art.

To minimize the probability of a "miss-correct" of the wrong data bit (e.g., because some 3-bit errors can miss aliases), especially ECC check-bits, the implementation may be set up such that the ECC check-bits (ECC-1 to ECC-4) can be interleaved or not be grouped into the same byte lane. For example, ECC-1 bit 7, ECC-2 bit 7, ECC-3 bit 7, ECC-4 bit 7, ECC-1 bit 6, ECC-2 bit 6, ECC-3 bit 6, and ECC-4 bit 6 can be grouped. The advantage of interleaving the ECC-1 to ECC-4 check-bits is that they are protected from adjacent cross talk errors. Similar interleaving schemes are not uncommon in ECC supported protocols.

In some embodiments, some of the ECC-1 to ECC-4 check-bits might not be used at all. In one embodiment, for example, only the ECC-5 check-bits are provided and carried on the C/BE[7:0]# pins for the data phase 306 whether a burst data phase or a DWORD data phase transaction.

As discussed above, the use of ECC can be optional according to the invention. A PCI-X device that supports ECC both generates the ECC and checks for making corrections using the ECC. In certain embodiments, such a device can use a PCI-X Status Register ECC Capable bit (e.g., bit 23) located in the status register in the device configuration space. Also, in certain embodiments, ECC generation and checking logic may only be activated when a PCI-X command register ECC Enable bit (e.g., bit 20) in the status register is enabled.

The present invention is fully backward compatible with full PCI products, supports both conventional non-ECC and ECC capable devices dynamically as well as transparently to the system software. When ECC mode is active, any single bit fault will be corrected without causing a crash or "blue screen" of the computer system. For example, embodiments of the present invention survive a single bit failure on the AD bus without crashing the system (i.e., without generating PERR# and/or SERR# signals). These embodiments improve error detection capability (up to 4 adjacent bits) on the PCI bus and overall data integrity of the system.

Parity and ECC

The present invention augments the current PCI parity protection scheme. The ECC check-bits are provided one clock earlier than the current parity scheme used by full PCI. The additional one clock helps for correctable errors because data phase information and the ECC check-bits are sent at the same time. ECC double bit exceptions are reported just like PCI parity exceptions. ECC does not interfere with standard PCI parity (PAR or PAR64) signals, thereby allowing for ECC to be seamlessly integrated with the full PCI protocol.

In summary, the present invention provides more robust and fault tolerant improvements for error recovery in PCI-X using ECCs for all 32-bit and 64-bit transactions, all done seamlessly by hardware with no impact to software. Such automated seamless hardware recovery further improves software-assisted errors.

The foregoing disclosure and description of the preferred embodiment are illustrative and explanatory thereof, and various changes in the components, circuit elements, circuit configurations, signals, and signal connections, as well as in the details of the illustrated circuitry and construction and method of operation may be made without departing from the spirit and scope of the invention.

What is claimed is:

1. A method, in a computer system, of providing error correction for PCI-X, the method comprising:
   creating a plurality of PCI-X phases in the computer system; and
   providing an error correction mechanism for PCI-X in the computer system by inserting error correction code check-bits into unused portions of the plurality of PCI-X phases.

2. The method of claim 1, wherein the inserting comprises inserting the error correction code check-bits into a PCI-X phase after a PCI-X attribute phase of the plurality of PCI-X phases.

3. The method of claim 1 wherein the inserting comprises inserting the error correction code check-bits into a clock phase after an attribute phase of the plurality of PCI-X phases.

4. The method of claim 1, wherein the inserting comprises inserting the error correction code check-bits into a PCI-X data phase of the plurality of PCI-X phases.

5. The method of claim 1, wherein the inserting comprises inserting the error correction code check-bits into a PCI-X C/BE[3:0]# portion of the plurality of PCI-X phases.

6. The method of claim 1, wherein the inserting comprises inserting the error correction code check-bits into a PCI-X C/BE[7:41]# portion of the plurality of PCI-X phases.

7. The method of claim 1, wherein the inserting comprises inserting the error correction code check-bits into an upper portion of a PCI-X attribute phase of the plurality of PCI-X phases.

8. The method of claim 1, wherein the inserting comprises inserting the error correction code check-bits into an unused PCI-X reserved drive high portion of the plurality of PCI-X phases.

9. The method of claim 1, further comprising transferring the error correction code check-bits across an interconnect in the computer system to a peripheral device.

10. The method of claim 9, wherein the peripheral device is an error correction code compatible device, and wherein the transferring comprises transferring the error correction code check-bits across the interconnect in the computer system to the error correction code compatible device.

11. The method of claim 9, wherein the peripheral device is an error correction code incompatible device, and wherein the transferring comprises transferring the error correction code check-bits across the interconnect in the computer system to the error correction code incompatible device.

12. The method of claim 1, wherein the inserting comprises inserting the error correction code check-bits into a PCI-X AD[63:32]# portion of the plurality of PCI-X phases.

13. The method of claim 1, wherein the inserting comprises inserting the error correction code check-bits into a PCI-X AD[31:0]# portion of the plurality of PCI-X phases.

14. The method of claim 1, wherein the inserting comprises inserting the error correction code check-bits into PCI-X AD[63:32]# and AD[31:00]# portions of the plurality of PCI-X phases.

15. The method of claim 1, wherein the inserting comprises inserting the error correction code check-bits such that use of the error correction code check-bits is fully backward compatible with the full PCI protocol.

16. A computer system comprising:
   a central processing unit connected to a host bus;
   a random access memory connected to a system memory bus;
   an extended peripheral component interconnect (PCI-X) bus operating according to a PCI-X protocol;
   a core logic chip coupled as a first interface bridge between the host bus and the system memory bus, as a second interface bridge between the host bus and the PCI-X bus, and as a third interface bridge between the system memory bus and the PCI-X bus;
   a PCI-X device coupled to the PCI-X bus, the PCI-X device operating according to the PCI-X protocol, the PCI-X device adapted to provide a plurality of PCI-X phases in a PCI-X transaction and insert error correction code check-bits into unused portions of the plurality of the PCI-X phases.

17. The computer system of claim 16, wherein the error correction code check-bits are inserted into an attribute portion of the plurality of PCI-X phases.

18. The computer system of claim 16, wherein the error correction code check-bits are inserted into a C/BE[3:0]# portion of the plurality of PCI-X phases.

19. The computer system of claim 16, wherein the error correction code check-bits are inserted into a C/BE[7:4]# portion of the plurality of PCI-X phases.

20. The computer system of claim 16, wherein the error correction code check-bits are inserted into a AD[63:0]# portion of the plurality of PCI-X phases.

21. The computer system of claim 16, wherein the error correction code check-bits are inserted into a AD[63:32]# portion of the plurality of PCI-X phases.

22. The computer system of claim 16, wherein the error correction code check-bits are inserted into a AD[31:00]# portion of the plurality of PCI-X phases.

23. The computer system of claim 16, wherein the plurality of PCI-X phases comprises an unused reserved drive high portion, and wherein the error correction code check-bits are inserted into the unused reserved drive high portion.

24. The computer system of claim 16, wherein use of the inserted error correction code check-bits is fully backward compatible with the full PCI protocol.

* * * * *